United States Patent
Bettenbuk et al.

(10) Patent No.: US 11,936,567 B2
(45) Date of Patent: Mar. 19, 2024

(54) DYNAMIC RATE LIMITING FOR SaaS APPLICATIONS

(71) Applicant: SaaS.group LLC, Las Vegas, NV (US)

(72) Inventors: Zoltan Bettenbuk, Eger (HU); Ian Kenneth Williams, Reigate (GB)

(73) Assignee: SaaS.group LLC, Las Vegas, NV (US)

( * ) Notice: Subject to any disclaimer, the term of this patent is extended or adjusted under 35 U.S.C. 154(b) by 384 days.

(21) Appl. No.: 17/523,348

(22) Filed: Nov. 10, 2021

(65) Prior Publication Data

US 2023/0143129 A1    May 11, 2023

(51) Int. Cl.
*H04L 47/28* (2022.01)
*G06F 9/54* (2006.01)

(52) U.S. Cl.
CPC .............. *H04L 47/28* (2013.01); *G06F 9/547* (2013.01)

(58) Field of Classification Search
CPC ................................. H04L 47/28; G06F 9/547
See application file for complete search history.

(56) References Cited

U.S. PATENT DOCUMENTS

| | | | |
|---|---|---|---|
| 2008/0239955 A1* | 10/2008 | Chang | H04L 47/10 370/232 |
| 2010/0064001 A1 | 3/2010 | Daily | |
| 2015/0149631 A1* | 5/2015 | Lissack | H04L 41/5051 709/226 |
| 2017/0031736 A1* | 2/2017 | Cooke | G06F 9/542 |
| 2017/0244709 A1 | 8/2017 | Jhingran et al. | |
| 2020/0192706 A1 | 6/2020 | Huus et al. | |
| 2022/0247686 A1* | 8/2022 | Rajagopalan | H04L 63/1416 |

OTHER PUBLICATIONS

International Search Report and Written Opinion of the International Searching Authority issued by the United States Intellectual Property Administration for corresponding International Patent Application No. PCT/US2021/058745, dated Feb. 4, 2022.

* cited by examiner

*Primary Examiner* — Hashim S Bhatti
(74) *Attorney, Agent, or Firm* — Myers Wolin, LLC

(57) ABSTRACT

A method is provided for dynamic rate limiting of user requests for a service implemented in a computer system. The method includes defining a standard rate limit as an active rate limit for a first user, receiving one or more requests from the first user defining a rate exceeding the active rate limit, and determining a maximum safe system rate for a system implementing the method. The method may then redefine the active rate limit as the lower of the maximum safe system rate and a previously defined burst rate limit associated with the first user. The system may then execute the one or more requests from the first user at or below the redefined active rate limit.

22 Claims, 2 Drawing Sheets

DYNAMIC RATE LIMITING FOR SaaS APPLICATIONS

FIELD OF THE INVENTION

This application relates to dynamic rate limiting for Software as a Service (SaaS) applications. In particular, this application relates to manually or automatically initiating a burst mode for a user where a user request exceeds a standard rate limit.

BACKGROUND

Pricing plans for SaaS applications, such as email applications or content scraping services, are very often not only based on usage counters, but the concurrent usage volume or usage rate is also limited. For example, an SaaS-based email application may, at a given price tier, provide an overall usage limit for some period of time, such as allowing a user to send up to 100,000 emails a month. The service may separately apply a daily sending limit at a lower number, such as 10,000 emails/day.

This may be both a business decision (to drive upsells), but also a system stability decision, in order to avoid overloading the service at any given time. Without a daily limit, an ecommerce platform may fail if all users are able to send their entirely monthly quota of emails (in this case, 100,000 emails) in a single day. This is because the system as a whole is typically designed to handle a certain number of transactions, such as email transmissions, in a given time frame.

Under normal conditions, emails sent by an ecommerce platform may be somewhat regularly distributed over time, and the resulting server load would therefore be readily predictable at a fraction of its capacity. Under such conditions, there would be no problem with users exceeding their limits. However, in order to protect against events that may drive large portions of their customer base to simultaneously send mass mailings, such as holiday sales, daily limits are applied.

Similarly, other SaaS applications, in which many users rely on a single server or set of servers may be able to reliably raise limits for individual users or small groups of users without exceeding the capacity of the system, but could not raise limits for the system as a whole without destabilizing the system.

Another example of such a system is a scraper SaaS platform, for scraping content from websites. Such a scraper may be implemented through an Application Programming Interface (API) and may have an overall volume limit, i.e., a number of monthly calls allowed under a specific plan, along with a smaller rate limit, or concurrency limit. Such a limit may apply to simultaneous or concurrent requests, or it may apply to some limit for a period of time shorter than the monthly calls above, such as daily calls. In the case of a concurrency limit, the system may prevent users from sending more than X (e.g. 50) concurrent API requests to the scraping system.

Such an approach, for the reasons noted above, applies an artificial—and in most of the times not needed—limitation to users that results in substantial unused system capacity and frustrated customers.

There is a need for a system in which such system-wide limitations are made dynamic at the user level in order to adapt to just in time requirements of users while keeping the system functional by preventing an overload of system capacity.

SUMMARY

In some embodiments, a method is provided for dynamic rate limiting of user requests for a service implemented in a computer system. The method includes defining a standard rate limit as an active rate limit for a first user, receiving one or more requests from the first user defining a rate exceeding the active rate limit, and determining a maximum safe system rate for a system implementing the method.

The method may then redefine the active rate limit as the lower of the maximum safe system rate and a previously defined burst rate limit associated with the first user. The system may then execute the one or more requests from the first user at or below the redefined active rate limit.

In some embodiments, the one or more requests is a batch of concurrent request.

In some embodiments, the further includes determining if the one or more requests define a rate exceeding the redefined active rate limit prior to execution and then executing the one or more requests only if the rate defined by the requests is less than the redefined active rate limit.

In some such embodiments, the method may then further provide an indication to the first user that the one or more requests are not being executed. In such a scenario, the system implementing the method may then receive a request from a user to implement an enhanced burst mode. The method then redefines the active rate limit as the lower of the maximum safe system rate and a previously defined enhanced burst rate limit larger than the burst rate limit associated with the first user and then executes the one or more requests from the first user concurrently.

In some embodiments, the redefined active rate limit is defined for a limited period of time after which the active rate limit reverts to the standard rate limit.

In some such embodiments, the method may determine an updated maximum safe system rate during the limited period of time and redefined the active rate limit as the lower of the updated maximum safe system rate and the previously defined burst rate limit associated with the first user if different than the existing active rate limit.

In some embodiments, the method receives an indication from the first user to increase the active rate limit prior to redefining the active rate limit. Such an indication may be independent of the one or more requests received from the first user.

In some such embodiments, the method maintains a count of indications received from the first user to increase the active rate limit over a limited period of time. In such embodiments, the active rate limit may be redefined only if the count is less than a threshold amount at a time of such an indication from the first user.

In some such embodiments, the count of indications is increased only if the active rate limit is greater than the standard rate limit by a threshold percentage.

In some embodiments, the system implementing the method receives authorization to redefine the active rate limit prior to redefining the active rate limit. Such authorization may be, for example, a manual authorization based on a user request or an automatic authorization based on system or user behavior. In some such embodiments, the method may maintain a count of instances in which authorization was received to redefine the active rate limit, and increasing the count only when such authorization is a manual authorization based on a received user request.

In some embodiments, an automatic authorization may be based on a metric of success associated with user requests, wherein if a success rate is below a threshold level, automatic authorization to redefine the active rate limit is received. In some such embodiments, the requests may be for scraping a website using an API, and the metric of success may be a scraping success rate.

In some embodiments, automatic authorization may be based on a threshold amount of available unused system capacity.

In some embodiments, the method may further comprise receiving data related to an external event from a database or a feed, evaluating the external event to determine whether the external event is likely to increase a number of requests from system users, and then issuing an automatic authorization based on a determination that the external event is likely to increase a number of requests from users.

In some such embodiments, the method further comprises determining whether the external event is likely to increase the number of requests from all system users or of only a subset of system users and issuing the automatic authorization only if the external event is likely to increase the number of requests from the subset of system users.

In some such embodiments, the method further confirms that the first user is a member of the subset of system users prior to issuing the automatic authorization.

In some such embodiments, the method determines an estimated size of the subset of system users relative to all system users prior to issuing the automatic authorization. The method then issues the automatic authorization only if the subset of system users is less than a threshold percentage of all system users.

In some embodiments, the method comprises confirming that the external event is likely to increase the number of requests from only the first user.

In some embodiments, the external event is a holiday. In some alternative embodiments, the external event is a store opening, and the subset is a number of system users located within a threshold distance of the store opening.

In some embodiments, the one or more requests are for scraping a website using an API.

DETAILED DESCRIPTION OF THE PREFERRED EMBODIMENTS

Figure 1:
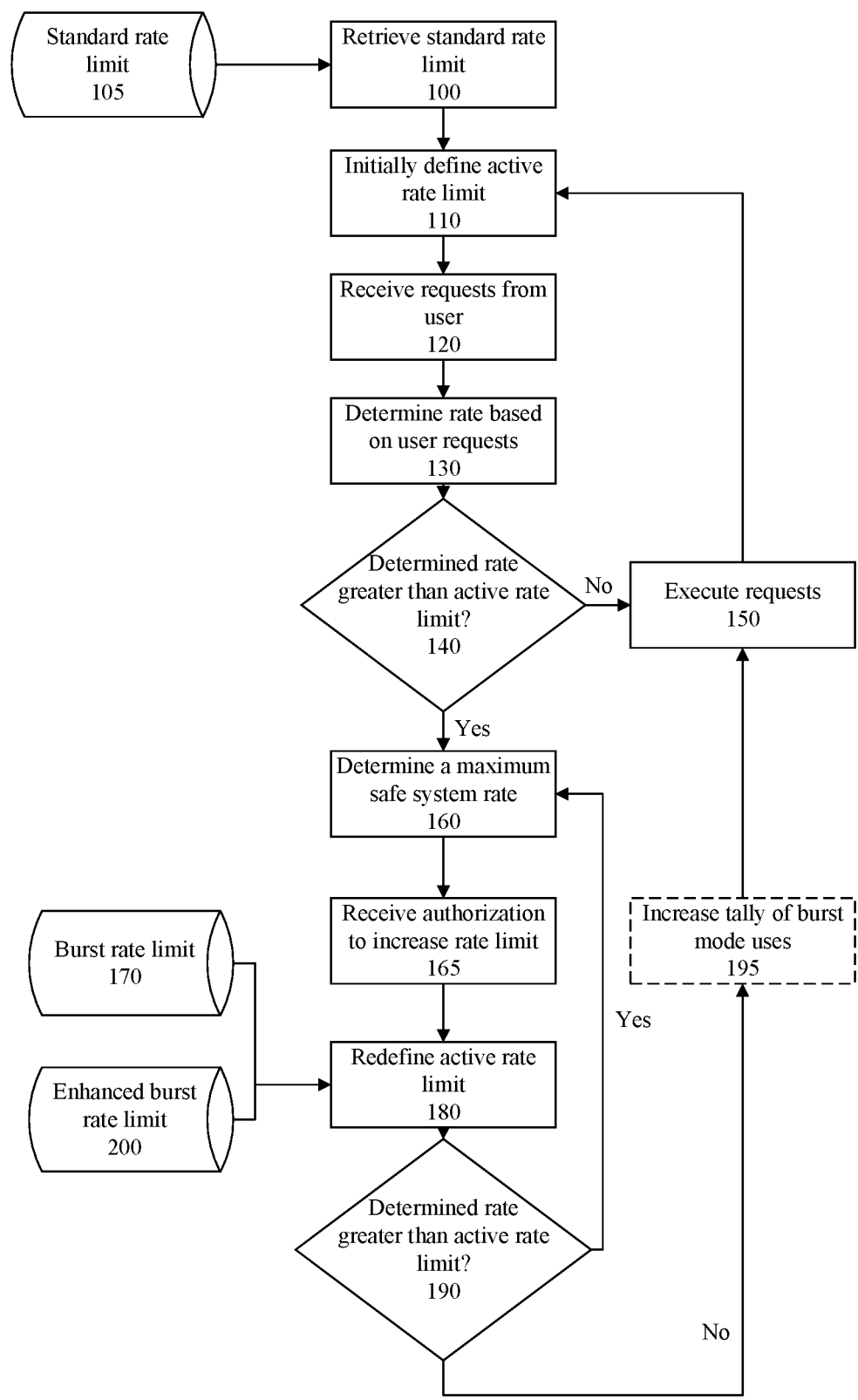
FIG. 1 is a flowchart showing a method for dynamic rate limiting of requests.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

The methods described herein provide dynamic rate limiting of requests, generally in an SaaS system, such as a scraping service for extracting data from websites or an ecommerce service for sending emails at scale. In a system implementing such a method, the system first In order to implement the method for dynamic rate limiting of user requests described herein, a system applying a standard rate limit for a particular user finds a trigger in order to determine if a user is authorized to apply a burst rate limit in place of the standard rate limit. That trigger may be a manual trigger, such as a request by a user, or it may be an automatic trigger, such as a system determination that the user is entitled to an increased rate limit. As discussed in more detail below, such a trigger may be at a user-level, such as an event or system failure applying only to that user, or it may be a broader trigger applicable to all users of the system or a subset of the users of the system.

The system implementing the method described separately determines a system-level metric, such as a maximum safe system rate, in order to ensure the system stability despite any burst volume granted to specific users or a subset of users.

FIG. 1 is a flowchart showing a method for dynamic rate limiting of requests in an SaaS system. As shown, a method is provided for dynamic rate limiting of requests from users, such as calls from a user to a scraping API, or requests from a user to transmit emails. It will be understood that while this disclosure describes the method generally in terms of a scraping API, this is for clarity and for the purpose of providing a concrete example, and other types of requests in the context of SaaS systems are contemplated as well.

As shown, the method first retrieves a standard rate limit for some service, such as scraping API calls, associated with the user (at 100). This is the rate applicable for the user under standard conditions, and corresponds to either a concurrency limit (i.e., 50 API calls per user request) or a rate limit for a short period of time (i.e., a number of calls per day). This rate limit is typically retrieved (at 100) from a database maintaining the standard rate limit 105. The specific standard rate limit 105 associated with the user may be based on that user's subscription plan, for example, or it may be a systemwide standard rate limit.

Once retrieved, and when the system is implementing the method, the method initially defines the standard rate limit retrieved as an active rate limit (at 110). This definition may be applied prior to receiving any requests from the user, such that some active rate limit is always defined when a user is accessing the system.

The method then receives requests from the user (at 120) and determines a rate based on the user requests (at 130). In the case of a concurrency requirement the rate is defined by the number of simultaneous requests, or it may be a rate implied by a number of requests or API calls over some period of time. The rate defined by the requests received from the user (at 120) is then compared to the active rate limit (at 140).

If the rate defined by the request is less than the active rate limit, which is initially set to the standard rate limit 105, the system simply executes the requests (at 150). This is the standard situation and no burst mode is required during normal usage. After a set of requests are executed (at 150), the system typically redefines the active rate limit (at 110) in preparation for future requests. However, in some embodiments, as discussed below, a user may activate a burst rate for some preset period of time. In such embodiments, the system may skip initially defining the active rate limit (at 110) and instead maintain an existing active rate limit and await further requests from the user (at 120).

Where the system receives requests from a user (at 120) that define a rate (at 130) exceeding the active rate limit, the requests and system status are further evaluated.

In some embodiments, the requests are initially denied, and the user may be prompted to indicate whether a burst rate limit should be applied, while in other embodiments, the method continues to immediately determine whether a burst rate limit should be applied. In any event, prior to considering an implementation of a burst rate limit, the method first determines a maximum safe system rate (at 160). Such a determination is for the system implementing the method, and may be based on, for example, a known capacity of the system as compared to a current or expected load on the system.

The maximum safe system rate (determined at 160) may be a real-time or near real-time evaluation determining a maximum safe rate for handling incoming concurrent user requests. Accordingly, the maximum safe system rate would typically be greater than the standard rate limit 105 for any system user, but may be greater than or less than authorized burst rate limits within the system.

The system may then receive authorization to increase the active rate limit (at 165) to a burst rate limit 170. This authorization may be a manual authorization based on a user request or explicit user authorization, or it may be an automatic authorization based on a system determination that an increased rate limit should be authorized based on system or user behavior. Such a system determination is discussed in more detail below with respect to FIG. 2.

Typically, requests that are received that define a rate exceeding the active rate limit that cannot be immediately executed are either rejected or queued. Accordingly, where a request is received and cannot be immediately executed because it is awaiting manual authorization, for example, the request may either be queued and kept pending until such manual authorization is provided, or it may be initially rejected and then resubmitted with such manual authorization.

The burst rate limit 170 is typically defined in a database incorporated into or accessible by the system implementing the method and it may be user specific, such that the user has an assigned burst rate limit, or it may be systemwide.

Once authorization is granted to increase the active rate limit (at 165), the system determines whether the defined burst rate limit 170 is greater than or less then the determined maximum safe system rate. The active rate limit is then redefined (at 180) to the lower of the maximum safe system rate and the previously defined burst rate limit 170 associated with the first user.

Once the active rate limit is redefined (at 180), the method may once again determine whether the rate determined based on user requests (at 130) is greater than the newly defined active rate limit (at 190). If not, the system may then proceed to execute the user requests (at 150) at or below the redefined active rate limit.

In some embodiments, where authorization to increase the rate limit (at 165) is provided by the user, the user may be provided with a limited number of burst mode requests. As such, where a user has requested use of burst mode, prior to executing the requests at the redefined active rate limit (at 150), a tally of burst mode uses may be increased (at 195). Further, in some embodiments, a user requested burst mode may remain active for some extended period of time, such as an hour, a day, or 48 hours following such a request. In such embodiments, after execution of such requests (at 150), the system may skip the defining of the active rate limit to the standard rate limit (at 110) and instead maintain the burst rate limit 170 as the active rate limit. In some embodiments, a user may be entitled to use an increased rate limit for some amount of time per window of time, such that a user may be entitled to 24 hours of increased rate limit time every month that they can turn on and off as needed.

If the determined rate is determined to be greater than the redefined active rate limit (at 190), then the method will not execute the requests (at 150). In some embodiments, the method will then terminate without executing the requests, while in other embodiments, the method will seek to further increase the active rate limit.

Accordingly, the system may first recalculate the maximum safe system rate (at 160) and then, again receive authorization to increase the rate limit (at 165). In some embodiments, the first and second authorizations to increase the rate limit take different forms. As such, the first authorization may be an automatic attempt to receive such authorization, as discussed below with respect to FIG. 2. If such an automatic increase to the burst rate limit 170 is not sufficient for a particular set of requests from the user, the system may then provide an indication to the first user that the one or more requests are not being executed. The user may then provide authorization to again increase the rate limit (at 165) to an enhanced burst rate limit 200 higher than the burst rate limit 170.

Once such authorization is received from the user (at 165), the active rate limit is again redefined (at 180) to the lower of the maximum safe system rate (determined at 160) and the enhanced burst rate limit 200. The system may then again determine if the rate determined based on user requests (at 130) is greater than the active rate limit.

In some embodiments, the first authorization to increase the rate limit (at 165) is from the user, while the second authorization, sought only after determining that the rate determined (at 130) is greater than the active rate limit (at 190), is an automatic authorization received only in limited circumstances.

As noted above, in embodiments where the user authorizes use of burst mode, such a burst mode may remain active for a limited period of time. As such, upon executing requests (at 150), the active rate limit does not revert to the standard rate limit 105. Instead, the active rate limit remains at the burst rate limit 170 or enhanced burst rate limit 200 as previously defined. In such an embodiment, the system continues to determine a maximum safe system rate (at 160). As such, prior to executing on a new request received from the user (at 120) at the active rate limit (at 140), the system may first determine the current maximum safe system rate (at 160) and redefine the active rate limit as the lower of the updated maximum safe system rate and the previously defined burst rate limit 170, 200 associated with the user, if different than the existing active rate limit.

Where the burst mode implementation is authorized by the user, the redefining of the active rate limit (at 180) is typically based on a request from the first user to increase the active rate limit. Such a request may be responsive to a notification from the system that a previous attempt to execute requests at the active rate limit has failed. The system interface may then present an option to the user to increase the rate limit. The request from the user is typically an indication independent of the one or more requests received from the user (at 120).

As noted above, in some embodiments, the system maintains a tally of burst mode uses (at 195). In some embodiments, upon receiving authorization from the user (at 165) and prior to redefining the active rate limit (at 180), the system may implement an additional check to confirm that the count is less than a threshold amount corresponding to the user's usage limit. Such a tally may reset at regular intervals, or it may decrease at some standard rate, such that the tally resets monthly or reduces by one weekly.

In some embodiments, where the determined maximum safe system rate (at 160) is close to the standard rate limit 105, burst mode may be implemented, but the active rate limit defined (at 180) would not be close the burst rate limit 170 or the enhanced burst rate limit 200 requests. In such embodiments, the tally of burst mode uses (at 195) may be increased to reflect the usage only if the active rate limit is greater than the standard rate limit 105 by some threshold percentage. Accordingly, the user may only be charged with a burst mode usage if the resulting active rate limit is more than 20% greater, for example, than the standard rate limit 105.

Alternatively, or in addition, where a burst rate implemented is limited by a determined maximum safe system rate, the burst rate may be applied for a longer period of time. Accordingly, where a burst rate is manually authorized, the burst rate may normally apply for one day, but if the maximum safe rate is only 20% greater than the standard rate limit 105, the burst rate may apply for two days instead. Further, the maximum safe rate may be reevaluated over the course of the time period, such that the accessible burst rate may be increased during the time period.

Figure 2:
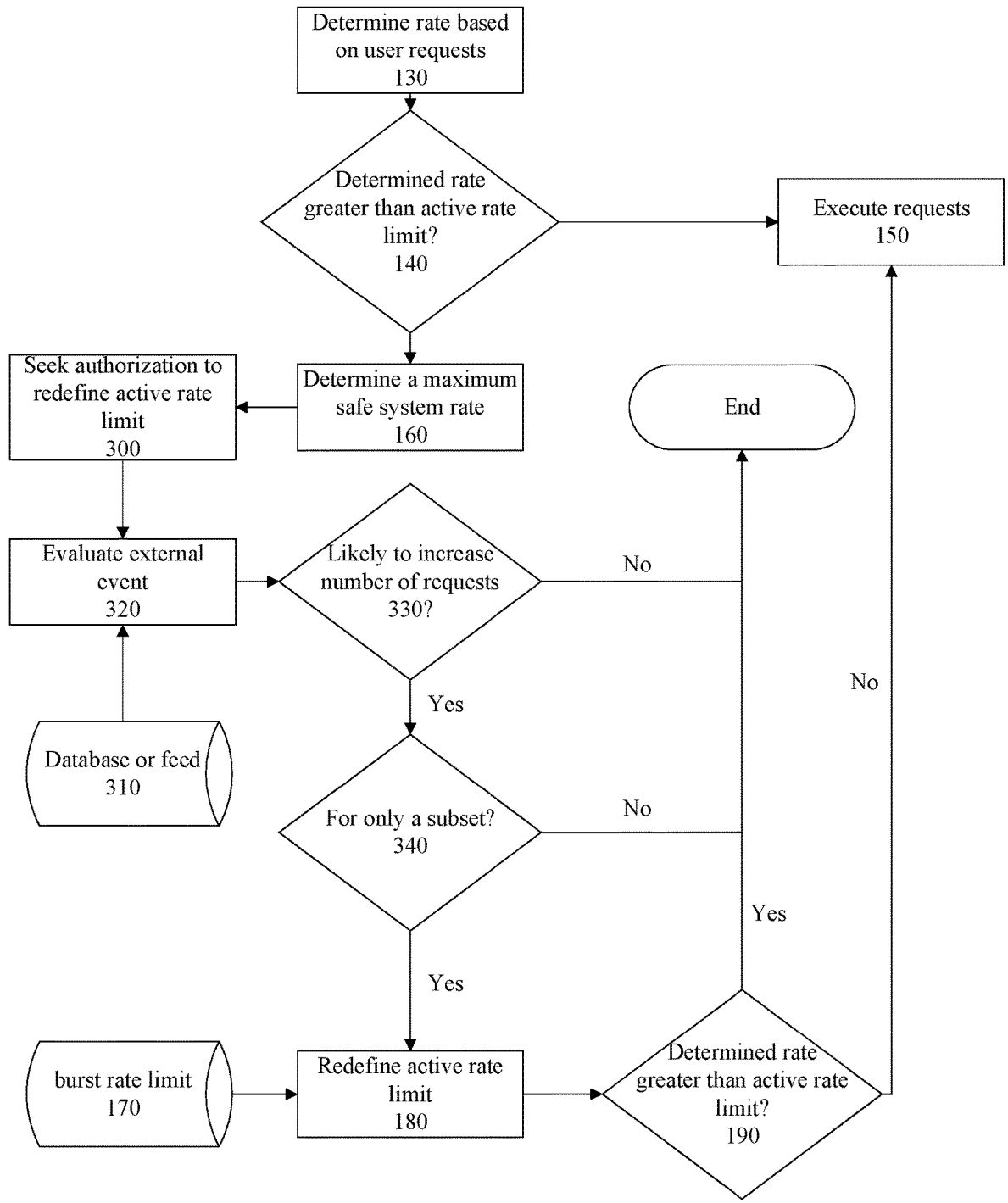
FIG. 2 is a flowchart showing a method for determining whether to automatically redefine an active rate limit.

FIG. 2 is a flowchart showing a method for determining whether to automatically redefine an active rate limit.

As discussed above with respect to FIG. 1, the method may first receive a number of requests from the user (at 120) after defining an initial active rate limit (at 110). Where the determined rate is not greater than the active rate limit, the method simply executes the requests as submitted (at 150). If the method determines that the determined rate is greater than the active rate limit (at 15), the method may then go on to determine a maximum safe system rate (at 160) and then seek authorization to redefine the active rate limit (at 300).

In some embodiments, or in some scenarios within embodiments, such authorization may be received from the user himself, as noted above with respect to the received authorization (at 165) in FIG. 1. In some embodiments, the authorization may be an automatic authorization based on system or user behavior.

Accordingly, while a user level trigger based on system performance or an external event may be granted without further evaluation, an external event may have broader impact. In order to properly define a user level or subset level trigger, the effect boundaries of a potential trigger must be analyzed.

For example, in the case of an SaaS-based transactional email application, a trigger could be an increase in volume requirements. However, the root cause of such an increase should be evaluated in order to determine whether it is truly a user-level trigger. For example, if the user needs to send more emails because the European Union changed its data protection rules, and all users must be informed, such a chance is not actually a user-level trigger. Instead, it may impact a large number of users, and may trigger a system wide increase in usage.

Alternatively, if the user is sending an increased number of emails, it may be due to opening a new shop at a new location, and a corresponding extended email campaign. Such a scenario is a true user level event, and is unlikely to increase demand for other users. Accordingly, it would likely be safe to increase the user's rate without destabilizing other parts of the system.

There are likely to be many other scenarios between the true user-level and the true system-wide triggers illustrated, and the individual events must therefore be evaluated. Triggers may be national or limited to specific niche markets, for example.

In the context of scraping, sites targeted by scrapers often modify their infrastructure, thereby reducing success rate. (the ratio between successful and failed fetches) may drop temporarily. In this case users may need to go over their concurrency limit (by leveraging burst requests or by being granted automatic authorizations) to ensure that some scraping quota is met. This increased rate may be applied not only while the lower success rate is present, but also for a certain time slot after the success rate normalizes too, in order to let the customers make up for the potentially failed scrapes. In some embodiments, this change should be fully automatic, as the system is capable of detecting the scraping success rates of individual users and can apply the override of the limits automatically. An example calculation of such an automatic authorization could be as follows:

$$C_{burst} = C_{user} * \max(100/S, M),$$

$C_{burst}$: The new (burst) concurrency limit of the customer.
$C_{user}$: The default concurrency limit of the customer.
S: the current success rate of the customer.
M: The max concurrency multiplier that is still safe to be applied to ensure system integrity.

In such embodiments, the system may evaluate one or more external event (320). This may be an event external to the user request, such as some metric of success associated with user requests. In such embodiments, the system may determine if a success rate is below some threshold level, and in such scenarios automatic authorization may be issued in order to redefine the active rate limit (at 180). For example, where the method applies to a scraping API, the requests issued by the user are for scraping a website using the API. The metric of success may be a scraping success rate, and where scraping has failed in more than a threshold percentage of attempts, the system may automatically authorize increasing the active rate limit for that particular user.

In some embodiments, the external event evaluated (at 320) may be, for example, some threshold amount of unused system capacity. In such a scenario, automatic authorization may be issued based on such unused system capacity, and may be marketed as a customer "bonus."

In some embodiments, the external events evaluated (at 320) are external to the system as a whole, and may be based on data received from a database or feed 310. In such embodiments, the externa event may be evaluated to determine whether the external event is likely to increase a number of requests from system users (at 330). If not, the method terminates without considering the event, but if so, the system may further evaluate whether such an increase is likely to come from all users or only a subset of users (at 340).

For example, the method may evaluate an upcoming holiday as an external event, and determine the number of users likely to be impacted by that holiday. Such impact may be regional, such as a national holiday, global, or more localized culturally, such as in the context of a religious holiday. Alternatively, the external event may be a store opening, and in such scenarios, the impact may be assessed based on location, such that users located within a threshold distance of the opening store, or users with scraping or marketing targets within a threshold distance of the opening store, are likely to increase their number of requests.

Similarly, the system may determine that user level system failures are related to a trigger, such as when a single store scraped by many users makes changes that cause scraping to fail. In such scenarios, the number of users to be impacted can be evaluated based on which users tent to target that store.

In some embodiments, the system may issue an automatic authorization based only on the first determination that the external event is likely to increase a number of requests from users (at 330). In such embodiments, the system them proceeds to redefine the active rate limit (at 180) and proceed with determining if the determined rate is greater than the active rate limit (at 190) as discussed above with respect to FIG. 1. In some such embodiments, the system may first confirm that applying such an increase to all system users will not conflict with the determined maximum safe system rate (determined at 160). Accordingly, the redefined active rate limit may be set to the maximum safe system rate.

In some embodiments, the system may issue an automatic authorization for users affected by the external event evaluated (at 320), and only if the external event is likely to increase the number of requests from only a subset of system users (determined at 340). Accordingly, prior to redefining the active rate limit (at 180) for the user requesting execution (at 120), the system determines if the user is a member of the subset of system users and only issues the automatic authorization after confirming the same.

In some embodiments, the system may first determine the size of the subset affected by the external event, such that it can estimate the number of users likely to increase their number of requests. The system may then issue the automatic authorization only where the subset is less than a threshold percentage of all system users.

In some embodiments, the subset may be only one user, or a small number of users. This may be, for example, the scenario noted above where a user is issued automatic authorization because a threshold number of scraping requests have failed.

In any event, the system may need to determine the overall impact of applying a redefined rate limit (at 180) to users affected by the external event in order to avoid overloading the system. Further, if more users are granted authorization for increased rate limits, the amount of that increase will be more limited by the maximum safe system rate.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" and like terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML, page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A method for dynamic rate limiting of requests comprising:
    defining a standard rate limit as an active rate limit for a first user;

receive one or more requests from the first user defining a rate exceeding the active rate limit;

determining a maximum safe system rate for a system implementing the method;

redefining the active rate limit as the lower of the maximum safe system rate and a previously defined burst rate limit associated with the first user; and executing the one or more requests from the first user at or below the redefined active rate limit.

2. The method of claim 1 wherein the one or more requests is a batch of concurrent requests.

3. The method of claim 1 further comprising determining if the one or more requests define a rate exceeding the redefined active rate limit prior to execution and executing the one or more requests only if the rate defined by the requests is less than the redefined active rate limit.

4. The method of claim 3 further comprising providing an indication to the first user that the one or more requests are not being executed;

receiving a request from a user to implement an enhanced burst mode;

redefining the active rate limit as the lower of the maximum safe system rate and a previously defined enhanced burst rate limit larger than the burst rate limit associated with the first user; and executing the one or more requests from the first user concurrently.

5. The method of claim 1, wherein the redefined active rate limit is defined for a limited period of time after which the active rate limit reverts to the standard rate limit.

6. The method of claim 5 further comprising determining an updated maximum safe system rate during the limited period of time and redefining the active rate limit as the lower of the updated maximum safe system rate and the previously defined burst rate limit associated with the first user if different than the existing active rate limit.

7. The method of claim 1 further comprising, prior to redefining the active rate limit, receiving an indication from the first user to increase the active rate limit, such indication being independent of the one or more requests received from the first user.

8. The method of claim 7 further comprising maintaining a count of indications received from the first user to increase the active rate limit over a limited period of time, and wherein the active rate limit is redefined only if the count is less than a threshold amount at a time of such indication.

9. The method of claim 8 wherein the count of indications is increased only if the active rate limit is greater the standard rate limit by a threshold percentage.

10. The method of claim 1 further comprising receiving authorization to redefine the active rate limit prior to redefining the active rate limit, wherein such authorization is one of a manual authorization based on a received user request and an automatic authorization based on system or user behavior.

11. The method of claim 10 further comprising maintaining a count of instances in which authorization was received to redefine the active rate limit, and wherein the count is increased only when such authorization is a manual authorization based on a received user request.

12. The method of claim 10 wherein the automatic authorization may be based on a metric of success associated with user requests, wherein if a success rate is below a threshold level, automatic authorization to redefine the active rate limit is received.

13. The method of claim 12 wherein the one or more requests are for scraping a website using an API and wherein the metric of success is a scraping success rate.

14. The method of claim 10 wherein the automatic authorization is based on a threshold amount of available unused system capacity.

15. The method of claim 10 further comprising receiving data related to an external event from a database or feed;

evaluating the external event to determine whether the external event is likely to increase a number of requests from system users;

issuing an automatic authorization based on a determination that the external event is likely to increase a number of requests from users.

16. The method of claim 15 further comprising determining whether the external event is likely to increase the number of requests from all system users or of only a subset of system users and issuing the automatic authorization only if the external event is likely to increase the number of requests from the subset of system users.

17. The method of claim 16 further comprising confirming that the first user is a member of the subset of system users prior to issuing the automatic authorization.

18. The method of claim 16 further comprising determining an estimated size of the subset of system users relative to all system users and issuing the automatic authorization only if the subset of system users is less than a threshold percentage of all system users.

19. The method of claim 15 further comprising confirming that the external event is likely to increase the number of requests from only the first user.

20. The method of claim 16 wherein the external event is a holiday.

21. The method of claim 16 wherein the external event is a store opening and wherein the subset is a number of system users located within a threshold distance of the store opening.

22. The method of claim 1 wherein the one or more requests are for scraping a website using an API.

\* \* \* \* \*